United States Patent [19]
Lutz et al.

[11] Patent Number: 6,012,285
[45] Date of Patent: Jan. 11, 2000

[54] EXHAUST PIPE WITH IMPROVED DRAIN

[75] Inventors: Todd J. Lutz, Oconomowoc; David N. Hoffman, Lomira, both of Wis.

[73] Assignee: Wacker Corporation, Menomonee Falls, Wis.

[21] Appl. No.: 09/044,666

[22] Filed: Mar. 19, 1998

[51] Int. Cl.⁷ ...................................................... F01N 3/02
[52] U.S. Cl. ...................................... 60/309; 55/DIG. 30
[58] Field of Search ................ 60/309, 324; 55/DIG. 30

[56] References Cited

U.S. PATENT DOCUMENTS

| | | |
|---|---|---|
| 786,555 | 4/1905 | Foster . |
| 1,388,554 | 8/1921 | Dubben et al. . |
| 2,468,961 | 5/1949 | Curphy . |
| 2,682,312 | 6/1954 | Hopkins . |
| 2,887,032 | 5/1959 | Wachter, Jr. . |
| 2,887,033 | 5/1959 | Wachter, Jr. . |
| 2,921,432 | 1/1960 | Marcotte et al. ........................ 60/309 |
| 3,043,393 | 7/1962 | Hopkins . |
| 3,307,470 | 3/1967 | Kenny et al. . |
| 3,415,338 | 12/1968 | McMillan . |
| 3,605,389 | 9/1971 | Buttler ...................................... 60/309 |
| 3,747,347 | 7/1973 | Ciraolo ...................................... 60/309 |
| 4,147,230 | 4/1979 | Ormond et al. . |
| 4,162,546 | 7/1979 | Shortell . |
| 4,450,934 | 5/1984 | Davis . |
| 4,541,240 | 9/1985 | Munro .............................. 55/DIG. 30 |
| 5,121,602 | 6/1992 | McCorvey ................................ 60/309 |
| 5,170,020 | 12/1992 | Kruger et al. . |
| 5,321,215 | 6/1994 | Kicinski . |

*Primary Examiner*—Thomas E. Denion
*Attorney, Agent, or Firm*—Nilles & Nilles, S.C.

[57] ABSTRACT

A vertically-extending L-shaped exhaust pipe and method of manufacturing same are disclosed. The exhaust pipe includes a drain hole located at the bottom of the horizontal portion of the exhaust pipe for allowing liquids to drain from the pipe in order to avoid harming upstream exhaust system or engine components. An elliptically shaped guide is welded into an arcuate slot immediately upstream of the drain hole and is angled in the downstream direction so as to direct the flow of liquid toward the drain opening and away from upstream exhaust system components. The present invention is simple to manufacture, eliminates the need for a noisy flapper lid, and maintains the structural integrity of the exhaust pipe.

18 Claims, 3 Drawing Sheets

EXHAUST PIPE WITH IMPROVED DRAIN

BACKGROUND OF THE INVENTION

1. Field of the Invention

The invention relates to a moisture control system for an exhaust pipe for an internal combustion engine and, more particularly, relates to a vertically-extending exhaust pipe that includes a drain for the removal of rainwater and other fluids which, in the absence of a rain guard, would otherwise be directed to upstream exhaust system components or the engine.

2. Discussion of the Related Art

Many industrial and agricultural machines that are powered by an internal combustion engine have an exhaust system that terminates in a vertically-extending exhaust pipe exhausting gases from the engine to a position above the machine. These machines include farm tractors, some semi-tractors, and a variety of industrial machines such as towed portable generators. The typical vertically-extending exhaust pipe used in this type of machine is L-shaped so as to have a vertical portion and a horizontal portion meeting at an elbow. An inlet end of the horizontal portion is connected to an upstream component, such as a muffler, of the machine's exhaust system. An exhaust gas outlet is formed from an open upwardly-facing end of the vertical portion. During operation, exhaust gases generated by the engine pass through the exhaust system components and are emitted from the exhaust gas outlet.

The upwardly-facing exhaust gas outlet of the typical vertically-extending exhaust pipe is exposed to the elements and, hence, is prone to invasion by moisture in the form of rainwater, snow, etc. when the engine is not operating. This moisture can degrade the operation of the exhaust system and lead to corrosion and early failure of the exhaust pipe and exhaust system components. In addition, when an engine having a vertically-extending exhaust pipe opening is started after being stored in a wet environment, the water that has accumulated in the exhaust pipe is ejected from the exhaust pipe by the outwardly flowing exhaust gases. This sooty mixture may soil or stain the operator or structures that are close to the exhaust pipe. Mechanisms therefore have been employed to keep rainwater and other moisture out of engine exhaust systems.

The most common mechanism for inhibiting moisture flow into an exhaust pipe is the rain guard or flapper lid. The typical flapper lid is pivotally mounted on the upper end of the exhaust pipe, covers the upper opening of the exhaust pipe when the engine is not operating, and lifts under pressure of exhaust gases when the engine is operating. While such flapper lids are generally effective at keeping rainwater out of exhaust systems, they must be fairly light-weight and be loosely mounted on the upper end of the exhaust pipe in order to be lifted easily by the exhaust gases without creating excessive back pressure or becoming caked with soot. Such lightweight, loosely fitting metal flapper lids tend to rattle and "clank" a great deal during engine operation. Indeed, it has been discovered that the flapper lid is the noisiest component of an otherwise quiet machine such as a gasoline-powered portable generator. Moreover, these structures tend to be rather flimsy and often fail well before the exhaust pipe requires replacement.

Various other solutions to the problem of exhaust pipe moisture flow have been proposed. For example, U.S. Pat. No. 2,468,961 to W. C. Curphy discloses a moisture-deflecting exhaust pipe attachment consisting of a tube bent so as to form a trap that attaches in a spaced relationship to the upper end of a vertically-extending exhaust pipe by a perforated connector ring. In operation, moisture entering the top of the bent tube flows along the tube walls and out of the attachment at the connector ring before reaching the exhaust pipe. Similarly, U.S. Pat. Nos. 2,887,032 and 2,887,033 to P. H. Wachter, Jr., both disclose an attachment that is mounted onto the upper end of a vertically-extending exhaust pipe and that incorporates a trap and associated drain for preventing rain water from flowing into an engine exhaust system. Such separate attachments are needlessly complex, require fitting to the outlet end of the exhaust pipe, increase the effective height of the exhaust pipe, and may come loose if the fit is not correct.

U.S. Pat. No. 4,450,934 to Max L. Davis discloses a complex trap arrangement disposed within a vertically-extending muffler canister. The trap arrangement includes a deflector plate that 1) channels downwardly flowing rainwater away from the muffler's inlet pipe and out through a drain hole and 2) permits upwardly-flowing exhaust gases to spiral 180 degrees around the deflector plate and out of the muffler. While Davis' solution is integrated with an exhaust system component, lacks the additional fittings associated with other proposed solutions and does not significantly increase the height of the exhaust pipe, it is needlessly complex.

Another, less elaborate solution to the problem of draining moisture from a vertically-extending exhaust pipe is to 1) cut a slot into a lower horizontal portion of the L-shaped exhaust pipe to form a drain and to 2) indent the bottom of the pipe upstream of the slot to form a channel. The channel generally directs rainwater toward the drain so that the rainwater will drain from the exhaust pipe before reaching other exhaust system components such as the muffler. Experience has shown, however, that these slots are only partially effective at preventing water from flowing into other exhaust system components. In addition, if the slots are large enough to provide even a generally effective drain, they seriously weaken the exhaust pipe structure to the point that the exhaust pipe corrodes and fails much sooner than it otherwise would.

Thus, none of the solutions heretofore proposed for addressing the problem of draining moisture from a vertically-extending exhaust pipe provide a compact, simple, quiet, structurally sound, and effective mechanism for achieving the desired result. What is needed therefore is a vertically-extending exhaust pipe which includes a drain for diverting moisture from the engine exhaust system and which is simple, effective, quiet, and does not impair the structural integrity of the exhaust pipe.

OBJECTS AND SUMMARY OF THE INVENTION

It is therefore a principal object of the invention to provide a vertically-extending exhaust pipe that is capable of draining rainwater and other liquids which would otherwise accumulate in an engine's exhaust system and to do so without generating additional noise such as would result from the use of a flapper lid.

Another object of the invention is to provide a vertically-extending exhaust pipe with a drain that meets the first principal object of the invention and, at the same time, that does not weaken the exhaust pipe to the point that the exhaust pipe corrodes and fails much sooner than it otherwise would.

In accordance with a first aspect of the invention, these objects are achieved by providing an exhaust pipe that includes a 1) generally horizontal portion having a near end, a far end, and an exhaust gas inlet on its far end, and 2) a generally vertical portion having a near end, a far end, and an exhaust gas outlet on its far end. The vertical and horizontal portions join at their near ends at an elbow. A drain opening is formed in the bottom of the horizontal portion for allowing liquid to drain from the exhaust pipe, and a guide is positioned inside the exhaust pipe between the drain opening and the exhaust gas inlet for directing the flow of liquid toward the drain opening and away from the exhaust gas inlet.

In accordance with another aspect of the invention, the guide of the exhaust pipe preferably is displaced at an acute angle with respect to the bottom of the generally horizontal portion and, more preferably, extends upwardly and inwardly away from the exhaust gas inlet.

The guide of the exhaust gas pipe preferably is welded into place at the location of a slot in which it is seated to at least essentially completely seal the slot opening and to provide added structural integrity to the exhaust pipe in the vicinity of the drain hole.

In order to maximize the effectiveness of the guide, the guide is placed at an angle of about 30° with respect to the generally horizontal portion of the exhaust pipe, has a shape that conforms generally to the shape of the inner periphery of the exhaust pipe, and is positioned so as to overlie the drain opening.

Yet another object of the invention is to provide a method of manufacturing an exhaust pipe having a drain for draining moisture from the exhaust pipe.

In accordance with yet another aspect of the invention, this object is achieved by providing an exhaust pipe having 1) a generally horizontal portion having a near end and a far end and an exhaust gas inlet on the far end, and 2) a generally vertical portion having a near end and a far end and an exhaust gas outlet on the far end so that the near ends of the portions join at an elbow. Other steps include forming a drain opening in the exhaust pipe at the bottom of the horizontal portion for allowing liquid to drain from the exhaust pipe, cutting an arcuate slot into the base of the generally horizontal portion proximate to the drain opening, inserting a guide through the arcuate slot, fixing the guide in place, and welding the guide into the arcuate slot.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which.

DETAILED DESCRIPTION OF THE PREFERRED EMBODIMENTS

Pursuant to the invention, a generally L-shaped, vertically-extending exhaust pipe for use with an internal combustion engine includes a drain hole for permitting liquids, such as rainwater, that may enter the upwardly-facing exhaust gas outlet of the exhaust pipe to drain out of the exhaust pipe before reaching other exhaust system components such as a muffler. A guide for channeling liquid to the drain hole is fixed in the exhaust pipe immediately upstream of the drain hole. The guide is welded in place so as to at least substantially completely seal a slot in which the guide is seated.

Figure 1:
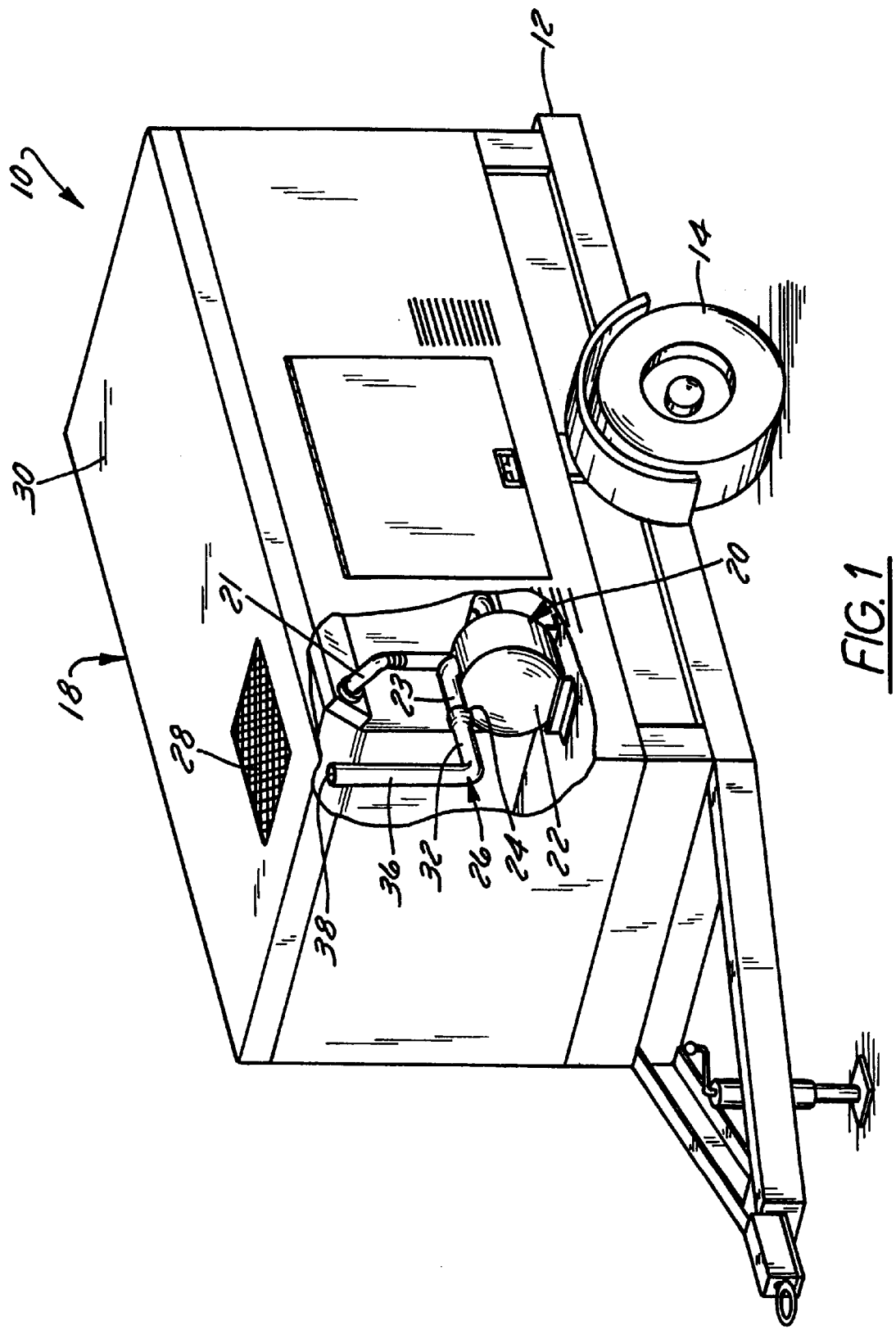
FIG. 1 is a partially cut-away perspective view of a portable generator showing an exhaust pipe constructed in accordance with the present invention and connected to a muffler of the portable generator's internal combustion engine's exhaust system.

The inventive vertically-extending exhaust pipe is usable with virtually any machine having an internal combustion engine that employs or may be configured to employ a vertically-extending exhaust pipe. The invention is particularly useful with machines in which quiet operation is important. These machines include portable generator units, such as the portable generator 10 shown in FIG. 1. Portable generator 10 includes a chassis 12, wheels 14, an engine/generator housing 18, and an internal combustion engine (not shown) and a generator (also not shown) encased within the engine/generator housing 18. An exhaust system for the engine is also mounted within the engine/generator housing 18. The exhaust system 20 includes an inlet pipe 21, a muffler 22, and the inventive exhaust pipe 26 which is connected to an outlet pipe 23 of the muffler 22 via a collar 24. Collar 24 is shown as a flared section of exhaust pipe 26, but could also comprise a separate sleeve fitting. The exhaust pipe 26 directs exhaust gas upwardly from the generally horizontal outlet pipe 23 of the muffler 22 and out to the atmosphere through a vent 28 in a roof 30 of the engine/generator housing 18.

Figure 2:
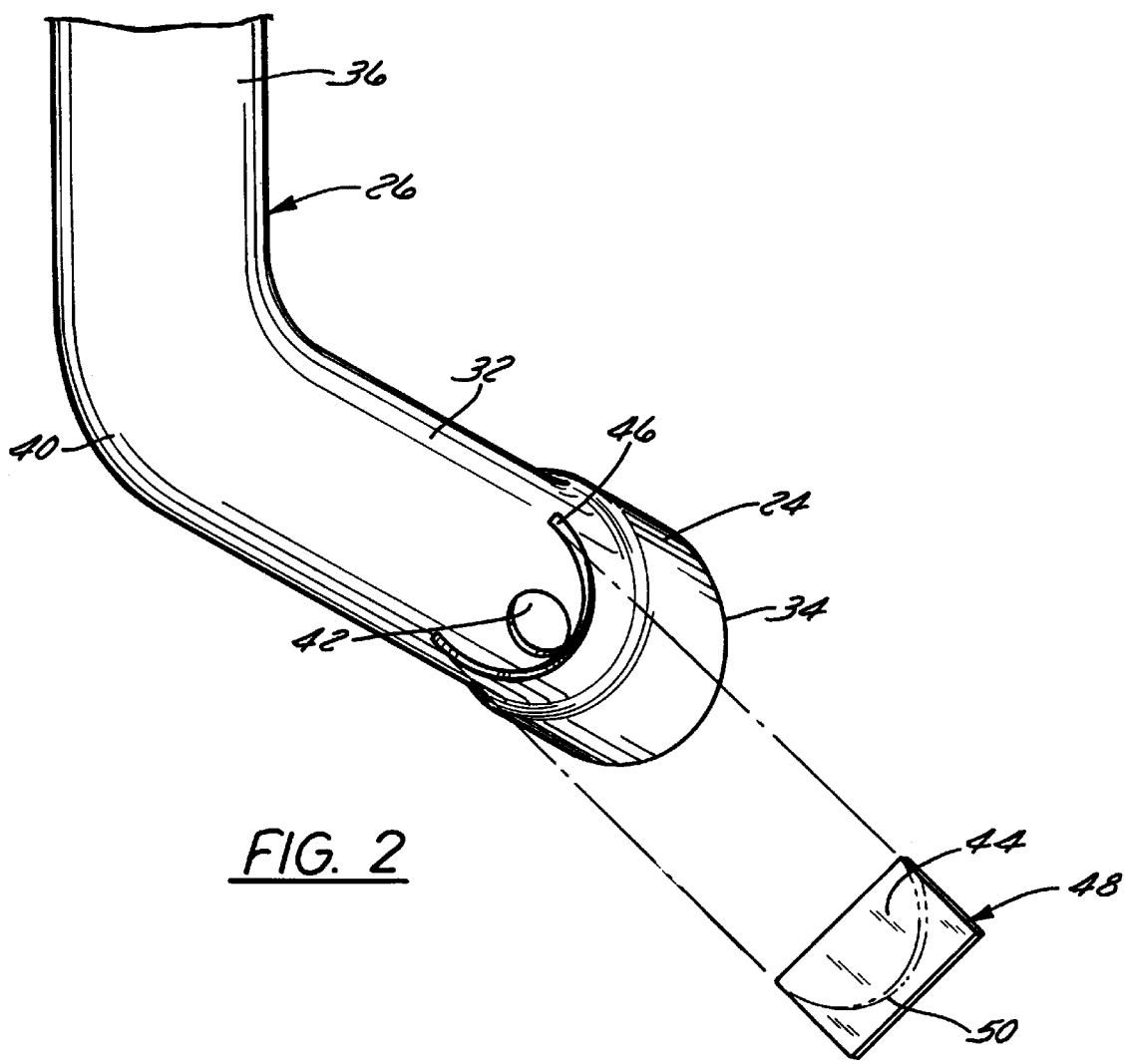
FIG. 2 is an exploded perspective view of the exhaust pipe of FIG. 1.
Figure 3:
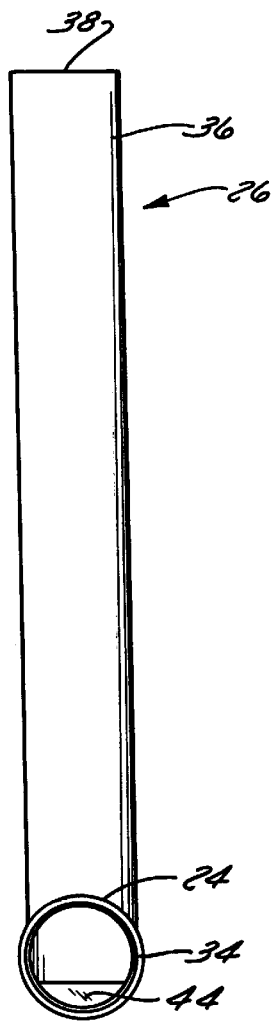
FIG. 3 is a side elevation view of the exhaust pipe of FIGS. 1 and 2.
Figure 4:
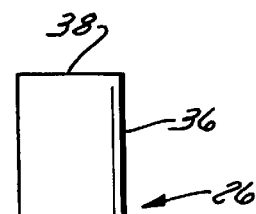
FIG. 4 is a front elevation view of the exhaust pipe of FIGS. 1 and 3.
Figure 5:
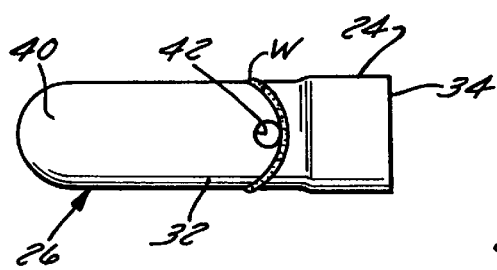
FIG. 5 is a bottom plan view of the exhaust pipe of FIGS. 1–4.
Figure 6:
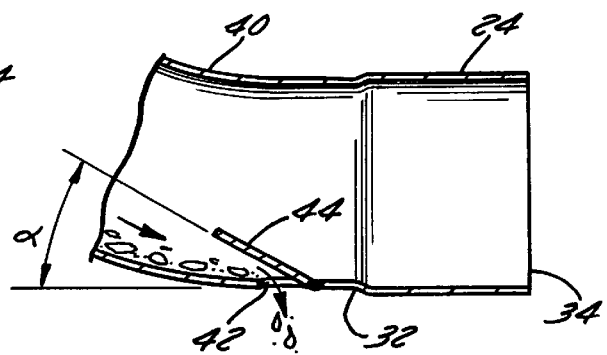
FIG. 6 is a side sectional elevation view of the exhaust pipe of FIGS. 1–5.

As can be seen most clearly in FIGS. 2–4, exhaust pipe 26 is a round pipe and is generally L-shaped so as to have 1) a generally horizontal portion 32 with an exhaust gas inlet 34 on the far end, and 2) a generally vertical portion 36 with an upwardly-facing exhaust gas outlet 38 on the far end. The portions 32 and 36 join at an elbow 40 which is typically about 90 degrees. The portions 32 and 36 and elbow 40 preferably are formed from a single piece of bent pipe but conceivably could be formed from separate interconnected members. A drain hole 42 is bored into the bottom of the horizontal portion 32 of exhaust pipe 26 at or near the elbow 40. Drain hole 42 is preferably sized to be large enough to permit water to escape quickly from exhaust pipe 26 yet small enough not to significantly weaken the exhaust pipe 26. For example, for a typical 2½" ID exhaust pipe, a drain hole with a diameter of less than 1", and preferably about ¾", has been found to be optimal. A guide 44 is mounted within the horizontal portion 32 for directing the flow of moisture toward drain hole 42. Guide 44 is elliptically shaped so as to generally conform to the shape of the inner periphery of exhaust pipe 26 when the guide is fixed in place inside exhaust pipe 26. Guide 44 may, depending on the shape of the exhaust pipe 26 and on the location of the guide within the exhaust pipe and the orientation of the guide with respect to the exhaust pipe, also be ovaloid, circular, rectangular, or other shape so long as it generally conforms to the shape of the inner periphery of the exhaust pipe. As best seen in FIG. 6, guide 44 extends at an acute angle α (preferably about 30°) with respect to the horizontal so as to extend over the drain hole 42 in order to direct moisture to drain hole 42 without obstructing the flow of exhaust gases throughout the exhaust pipe 26. In the case of a typical 2½" ID exhaust pipe, guide 44 is preferably about 1.5" in length and is positioned about 2.5" from the exhaust gas inlet 34 of exhaust pipe 26.

To fabricate the drain/guide assembly, an arcuate angled slot 46 is cut into the bottom of the horizontal portion 32 of exhaust pipe 26 immediately upstream of drain hole 42 as seen in FIG. 2 to permit the insertion of a plate 48 from which the guide 44 is to be formed. Slot 46 is angled, preferably at about 30°, away from the exhaust gas inlet end of the exhaust pipe 26 in order to guide insertion of plate 48 at the proper angle. The plate 48 is welded into slot 46, as shown in FIG. 3, so that slot 46 is at least substantially entirely sealed by the weld W and such that only the drain hole 42 remains. By at least substantially entirely eliminating the slot 46, the weld W improves the structural integrity of exhaust pipe 26 in the vicinity of drain hole 42. The plate 48 is then cut or ground about an arc 50 so that the outer surface of the resulting guide 44 is essentially flush with the outer surface of the exhaust pipe 26.

The operation of the novel exhaust pipe 26 of the present invention is simple and yet elegant. When rainwater, snow, or other moisture enters the upwardly-facing exhaust gas outlet 38 of exhaust pipe 26, it flows to the bottom of elbow 40 and is channeled by guide 44 to drain hole 42, where it flows out of exhaust pipe 26. Guide 44 prevents the flow of moisture past drain hole 42 and protects upstream exhaust system components from being damaged by the moisture. At the same time, guide 44 is easily welded into position to maintain the structural integrity of the exhaust pipe 26. Moreover, because its drain is formed integrally with it, the exhaust pipe 26 is no longer higher than conventional vertically-extending exhaust pipes. Finally, when the engine is in operation, the inventive exhaust pipe 26 operates noiselessly and reliably—unlike exhaust pipes employing traditional flapper lids.

The present invention provides a simple solution to the problem of draining moisture from a vertically-extending exhaust pipe without the use complicated, large traps or of a noisy flapper valve. It is easy to manufacture, and also maintains or improves the structural integrity of the exhaust pipe.

Many changes and modifications could be made to the invention without departing from the spirit thereof. The scope of these and other changes will become apparent from a reading of the appended claims.

I claim:

1. An exhaust pipe for conducting exhaust gases from an internal combustion engine and for allowing liquids to drain from the exhaust pipe without harming other exhaust system or engine components, the exhaust pipe comprising:

a generally horizontal portion having a near end, a far end, and an exhaust gas inlet on the far end thereof;

a generally vertical portion having a near end, a far end, and an upwardly-facing exhaust gas outlet on the far end thereof, the portions being joined at their near ends so as to form an elbow;

a drain opening being formed in the horizontal portion and being operable to allow liquid to drain from the exhaust pipe;

a guide which is positioned inside the exhaust pipe, which extends through a slot cut into a base of the horizontal portion at a location upstream of said drain opening in the direction of exhaust gas flow, and which directs liquid, flowing from the exhaust gas outlet towards the exhaust gas inlet, towards the drain opening and away from the exhaust gas inlet.

2. The exhaust pipe of claim 1, wherein the guide is displaced at an acute angle with respect to a base of the generally horizontal portion so as to extend over the drain opening.

3. The exhaust pipe of claim 2, wherein the slot is an arcuate slot proximate to the drain opening.

4. The exhaust pipe of claim 2, wherein the angle is about 30 degrees.

5. The exhaust pipe of claim 2, wherein the guide is about 1.5 inches in length.

6. The exhaust pipe of claim 2, wherein the guide conforms in shape to the shape of the inner periphery of the exhaust pipe.

7. The exhaust pipe of claim 2, wherein the guide is positioned about 2.5 inches from the exhaust gas inlet.

8. The exhaust pipe of claim 7, wherein the guide is about 1.5 inches in length.

9. The exhaust pipe of claim 1, wherein the drain hole is generally circular in shape.

10. The exhaust pipe of claim 1, wherein the drain hole has a diameter of less than 1".

11. The exhaust pipe of claim 1, wherein the drain hole has a diameter of about ¾".

12. An exhaust pipe for conducting exhaust gases from an internal combustion engine and for allowing liquids to drain from the exhaust pipe without harming the engine, the exhaust pipe comprising:

a generally horizontal portion having a near end, a far end, and an exhaust gas inlet on the far end thereof;

a generally vertical portion having a near end, a far end, and an upwardly-facing exhaust gas outlet on the far end thereof, the portions being joined at their near ends so as to form an elbow;

a drain hole being formed in the exhaust pipe and being positioned at the bottom of said horizontal portion so as to allow liquid to drain from the exhaust pipe;

a guide positioned inside the exhaust pipe between the drain hole and the exhaust gas inlet, wherein the guide 1) extends upwardly and inwardly away from the exhaust gas inlet at an acute angle, and 2) directs the flow of liquid towards the drain hole and away from the exhaust gas inlet.

13. The exhaust pipe of claim 12, wherein the guide is positioned about 2.5 inches from the gas inlet.

14. The exhaust pipe of claim 12, wherein the guide conforms in shape to the inner periphery of the exhaust pipe.

15. The exhaust pipe of claim 12, wherein the guide is welded into an arcuate slot cut into the base of the horizontal portion proximate to the drain hole.

16. The exhaust pipe of claim 12, wherein the drain hole is generally circular in shape and has a diameter of less than 1".

17. An exhaust pipe for conducting exhaust gases from an internal combustion engine and for allowing liquid to drain from the exhaust pipe without harming other exhaust system or engine components, the exhaust pipe comprising:

a generally horizontal portion having a near end, a far end, and an exhaust gas inlet on the far end thereof;

a generally vertical portion having a near end, a far end, and an upwardly-facing exhaust gas outlet on the far end thereof, the portions being joined at their near ends so as to form an elbow, wherein a drain opening is formed in the horizontal portion and is operable to allow liquid to drain from the exhaust pipe, and wherein an arcuate slot is formed in the horizontal portion between the drain opening and the exhaust gas inlet; and a guide plate which is mounted in the arcuate slot so as to at least substantially fill and seal the arcuate slot and which extends upwardly from the arcuate slot so as to direct liquid, flowing from the exhaust gas outlet towards the exhaust gas inlet, towards the drain opening and away from the exhaust gas inlet.

18. An exhaust pipe as defined in claim 17, wherein the guide plate extends over at least a portion of the drain opening.

* * * * *